(12) United States Patent  (10) Patent No.: US 9,157,002 B2
Lopez et al.  (45) Date of Patent: Oct. 13, 2015

(54) PHASE CHANGE INK PIGMENT DISPERSION PROCESS

(71) Applicant: Xerox Corporation, Norwalk, CT (US)

(72) Inventors: Karina Lopez, Richmond Hill (CA); Enno Eric Agur, Toronto (CA); Santiago Faucher, Oakville (CA); Frank Ping-Hay Lee, Oakville (CA); Aurelian Valeriu Magdalinis, Aurora (CA); Biby Esther Abraham, Mississauga (CA); Daniel Lafontaine, Calgary (CA); Jonathan Lisk, Burlington (CA)

(73) Assignee: Xerox Corporation, Norwalk, CT (US)

( * ) Notice: Subject to any disclaimer, the term of this patent is extended or adjusted under 35 U.S.C. 154(b) by 187 days.

(21) Appl. No.: 13/940,731

(22) Filed: Jul. 12, 2013

(65) Prior Publication Data

US 2015/0013567 A1    Jan. 15, 2015

(51) Int. Cl.
*C09D 11/00* (2014.01)
*C09D 11/322* (2014.01)
*C09D 11/34* (2014.01)

(52) U.S. Cl.
CPC .............. *C09D 11/322* (2013.01); *C09D 11/34* (2013.01)

(58) Field of Classification Search
CPC ....................................................... C09D 11/34
See application file for complete search history.

(56) References Cited

U.S. PATENT DOCUMENTS

| 4,830,671 | A | 5/1989 | Frihart et al. |
| 4,889,560 | A | 12/1989 | Jaeger et al. |
| 4,889,761 | A | 12/1989 | Titterington et al. |
| 5,184,783 | A | 2/1993 | Hockmeyer et al. |
| 5,194,638 | A | 3/1993 | Frihart et al. |
| 5,195,430 | A | 3/1993 | Rise |
| 5,372,852 | A | 12/1994 | Titterington et al. |
| 5,389,958 | A | 2/1995 | Bui et al. |
| 5,451,483 | A * | 9/1995 | Fuller et al. ................... 430/114 |
| 5,497,948 | A | 3/1996 | Hockmeyer |
| 5,597,856 | A | 1/1997 | Yu et al. |
| 5,750,604 | A | 5/1998 | Banning et al. |
| 5,780,528 | A | 7/1998 | Titterington et al. |
| 5,782,966 | A | 7/1998 | Bui et al. |
| 5,783,658 | A | 7/1998 | Banning et al. |
| 5,820,040 | A | 10/1998 | Hockmeyer et al. |
| 5,827,918 | A | 10/1998 | Titterington et al. |

(Continued)

FOREIGN PATENT DOCUMENTS

| GB | 2238792 | 6/1991 |
| GB | 2290793 | 1/1996 |

(Continued)

*Primary Examiner* — Veronica F Faison
(74) *Attorney, Agent, or Firm* — Marylou J. Lavoie, Esq. LLC

(57) ABSTRACT

A process for preparing a pigment dispersion including melting a phase change ink carrier and an optional dispersant at a temperature of from about 100° C. to about 170° C. in a jacketed vessel comprising a jacket surrounding an immersion mill or basket mill attachment and a dispersion blade attachment disposed within the jacketed vessel; mixing the melted phase change ink carrier and optional dispersant with a dispersion blade in the jacketed vessel; adding a pigment to the melted, mixed phase change ink carrier and optional dispersant in the jacketed vessel; wetting the pigment; after pigment wetting, reducing the pigment particle size using an immersion mill or basket mill attachment in the jacketed vessel; and discharging the pigment dispersion.

21 Claims, 1 Drawing Sheet

(56) References Cited

U.S. PATENT DOCUMENTS

| | | | |
|---|---|---|---|
| 5,830,942 | A | 11/1998 | King et al. |
| 5,919,839 | A | 7/1999 | Titterington et al. |
| 6,174,937 | B1 | 1/2001 | Banning et al. |
| 6,255,432 | B1 | 7/2001 | Evans et al. |
| 6,309,453 | B1 | 10/2001 | Banning et al. |
| 6,860,930 | B2 | 3/2005 | Wu et al. |
| 7,175,118 | B2 | 2/2007 | Hockmeyer |
| 7,377,971 | B2 | 5/2008 | Wu et al. |
| 7,381,254 | B2 | 6/2008 | Wu et al. |
| 7,407,539 | B2 | 8/2008 | Wu et al. |
| 7,559,493 | B1 * | 7/2009 | Hockmeyer et al. ............ 241/21 |
| 7,828,234 | B1 | 11/2010 | Hockmeyer et al. |
| 7,883,036 | B1 | 2/2011 | Cullens et al. |
| 7,914,200 | B1 | 3/2011 | Hockmeyer et al. |
| 7,973,186 | B1 | 7/2011 | Goredema et al. |
| 8,182,133 | B1 | 5/2012 | Hockmeyer et al. |
| 8,376,252 | B1 | 2/2013 | Hockmeyer et al. |
| 8,653,153 | B1 * | 2/2014 | Vanbesien et al. ................ 522/8 |
| 2008/0090034 | A1 * | 4/2008 | Harrison et al. ........... 428/32.71 |
| 2012/0235078 | A1 * | 9/2012 | Iftime et al. ............... 252/62.54 |
| 2014/0303297 | A1 * | 10/2014 | Agur et al. .................... 524/159 |

FOREIGN PATENT DOCUMENTS

| | | |
|---|---|---|
| GB | 2294939 | 5/1996 |
| GB | 2305670 | 4/1997 |
| GB | 2305928 | 4/1997 |
| WO | WO 94/14902 | 7/1994 |
| WO | WO 95/04760 | 12/1995 |
| WO | WO 96/14364 | 5/1996 |
| WO | WO 97/12003 | 4/1997 |
| WO | WO 97/13816 | 4/1997 |
| WO | WO 97/33943 | 9/1997 |

* cited by examiner

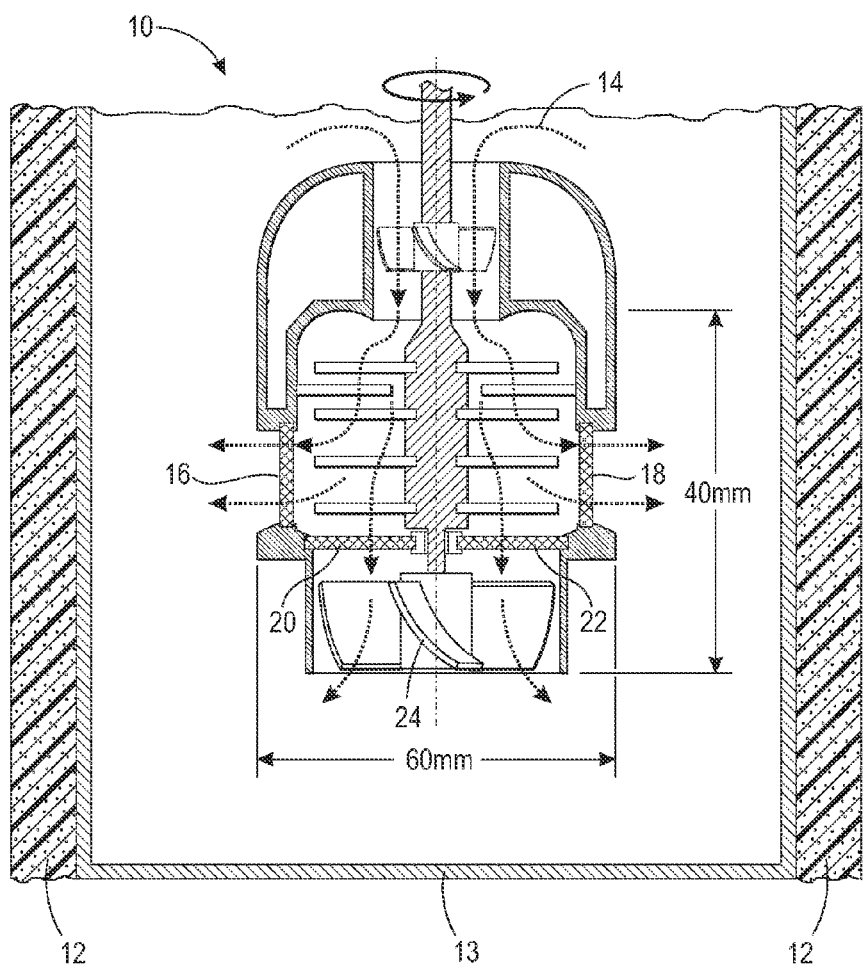

PHASE CHANGE INK PIGMENT DISPERSION PROCESS

BACKGROUND

Disclosed herein is a process for preparing a pigment dispersion.

Pigment dispersions for pigmented phase change ink (sometimes referred to as hot melt ink or solid ink) require milling of pigments to a particle size preferably as small as the primary particle size of the pigment which can be 100 nanometers in diameter or less. Pigment size reduction can be costly and energy intensive. Known technologies that are suitable for dispersing pigments in wax media at temperatures higher than 100° C. include attrition, extrusion and homogenization. These processes require excessive milling times (up to 7 days milling time) and in some cases known processes are not even capable of delivering the required pigment particle size. Furthermore, in processes that utilize milling media (stainless steel, silica, zirconia, etc.) media wear can result in ink contamination.

Pigment dispersion is an important step in the manufacturing of pigmented phase change ink. Pigments are often supplied by the manufacturer as dry aggregates and agglomerates many times larger than the primary particle size (usually on the order of less than about 100 nanometers in diameter). These aggregates or agglomerates have to be reduced in size to less than about 100 nanometers in diameter with a narrow particle size distribution to form a stable dispersion in the solid ink medium. This is needed for the resulting solid ink formulation to demonstrate good jetting and print quality performance.

Processes for particle dispersion and pigment size reduction, such as milling and homogenization, are known. These known processes operate at room temperature, or at elevated temperatures, but still significantly below 100° C.

A need remains for a process for dispersion of pigments for pigmented phase change ink wherein the pigment must be dispersed at a high temperature, such as in a wax medium at a temperature of about 120° C. or higher, wherein the said high temperature is above the melting point of said wax medium. High temperatures present serious challenges for most milling technologies. For example, if there are regions in the mill where the temperature can drop below the melting point of the wax, especially during startup, solidification of the wax can occur causing stoppage. Most milling technologies, therefore, are not suitable for waxes at such high temperatures. Indeed, many mill manufacturers have virtually no experience running their equipment at these temperatures.

High temperature processes that can be used for dispersing pigments for phase change ink applications include extrusion, homogenization and/or attrition. These processes have been examined, but they are lengthy in process time (taking many hours or days) resulting in high cost, and in many cases do not reduce the pigment particle size to the desired size. Due to the length of the processes, contamination of the pigment dispersion by media wear (erosion) is also a concern.

Currently available pigment dispersion processes are suitable for their intended purposes. However a need remains for improved pigment dispersion processes. Further, a need remains for an improved pigment dispersion process suitable for dispersing pigments in phase change ink employing high melting wax carriers. Further, a need remains for an improved pigment concentrate that can be used for dispersion processes for solid inks. Further a need remains for improved pigment concentrates for pigment dispersion processes wherein an intermediate highly concentrated pigment concentrate can be prepared and then let down to its final concentration in a final product such as a phase change ink.

The appropriate components and process aspects of the each of the foregoing U. S. patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

A process for preparing a pigment dispersion comprising melting a phase change ink carrier and an optional dispersant at a temperature of from about 100° C. to about 170° C. in a jacketed vessel comprising a jacket surrounding an immersion mill, a jacket surrounding a basket mill, or a jacket surrounding a dispersion blade attachment, disposed within the jacketed vessel; mixing the melted phase change ink carrier and optional dispersant with a dispersion blade in the jacketed vessel; adding a pigment to the melted, mixed phase change ink carrier and optional dispersant in the jacketed vessel; wetting the pigment; after pigment wetting, reducing the pigment particle size in the vessel; and discharging the pigment dispersion.

BRIEF DESCRIPTION OF THE DRAWINGS

FIG. 1 is a cutaway view of a milling apparatus suitable for the process of the present disclosure.

DETAILED DESCRIPTION

Pigment dispersion processes are provided which take place in the setting of a jacketed vessel surrounding a mill, in embodiments a jacketed vessel surrounding a basket mill or an immersion mill. Generally, the mill comprises a vessel with a heating jacket, a disperser blade for mixing the phase change carrier and optional dispersant and later mixing the phase change carrier and optional dispersant and pigment to wet the pigment, or an immersion mill head (basket assembly) containing the grinding media, in embodiments, ceramic grinding media, for dispersing the pigment. In one embodiment, all of the melting, mixing, wetting and dispersion takes place in the same vessel and the mixing blade is replaced by the immersion mill or basket mill. In another embodiment, the melting, mixing and wetting takes place in a different vessel and the wetted mixture is then transferred to the immersion mill.

In embodiments, the process for preparing ink concentrate comprises first using a high shear disperser impeller attachment inside a jacketed vessel for raw materials melting and pigment wetting, followed by pigment grinding with grinding media, such as zirconia grinding media, inside an immersion mill or basket mill attachment.

The process herein comprises a high temperature ink concentrate preparation process. In embodiments, the ink concentrate preparation for phase change ink applications is a batch process. The high temperature process herein takes place inside a jacketed vessel which, in embodiments, is connected to a circulation type heating bath which circulates oil or glycol into the jacket of the vessel for heating and cooling purposes.

In embodiments, a first step comprises melting raw materials. In embodiments, melting raw materials comprises using a high shear disperser blade or impeller attachment inside the jacketed vessel. The impeller rotational speed (rpm), tip speed (feet per second) and temperature can be any suitable or desired speed or temperature, in embodiments, at temperatures higher than 100° C., higher than 120° C., 100 to about 170° C., 110 to 170° C., or 110 to 160° C., an rpm of from about 500 to about 5,500 rpm, or 500 to about 5,000 rpm, or 3,000 to about 5,200 rpm, and a tip speed of 4 to 40 feet per second or 23 feet per second to 40 feet per second.

In embodiments, a second step comprises a pigment wetting step comprising adding pigment slowly into a molten ink vehicle and dispersant using the same high shear disperse blade or impeller attachment.

In embodiments, a third step comprises a pigment grinding step. Prior to the pigment grinding step, the high shear disperser blade can be removed from the jacketed vessel and replaced by an immersion mill or basket mill attachment. The basket mill can contain screens having suitable openings, such as 0.1 millimeter openings, on the side and bottom and can be filled with grinding media, such as ceramic grinding media, in embodiments, 0.3 millimeter diameter spherical zirconia grinding media. The basket mill can use an auger to draw the slurry into the mill. The centrifugal force exerted by the rotor and grinding media push the slurry out through the side and bottom screen. Milling can proceed for any suitable or desired time, in embodiments, for hours, until a desirable particle size distribution is achieved.

In embodiments, a fourth step comprises a product discharge step which can include pouring the molten product into an aluminum tray or other container.

Any suitable or desired mill can be selected for the processes herein. In embodiments, the mill can be as described in U.S. Pat. No. 7,559,493, which is hereby incorporated by reference herein in its entirety. In embodiments, the process herein can be carried out using a Hockmeyer HCPN Dispermill®, available from Hockmeyer Equipment Corporation, which is a micro mill. This is an immersion mill including a vertical basket mill that utilizes grinding media to reduce the particle size of materials, such as for example, pigments. In further embodiments, the mill can be a mill as described in U.S. Pat. Nos. 5,184,783; 5,497,948; 5,820,040; 7,175,118; 7,559,493; 7,828,234; 7,883,036; 7,914,200; 8,182,133; or 8,376,252; each of which is hereby incorporated by reference herein in their entireties.

FIG. 1 shows a jacketed vessel 10 including a jacket 12 surrounding a vessel 13. The jacketed vessel can be connected to a heating device such as a circulation type heating bath (not shown). A basket assembly 14 such as a high-shear disperser impeller or an immersion mill or basket mill can be disposed within the jacketed vessel 10. The basket assembly includes flow paths indicated by the arrows, screens 16, 18, 20, 22 and dispersion blade 24. The basket can be filled with ceramic grinding media.

A low cost, high throughput rate, high temperature pigment dispersion process for phase change ink is described. In embodiments, a process for preparing a pigment dispersion comprises melting a phase change ink carrier and an optional dispersant in a vessel comprising a heating jacket surrounding a mill, in embodiments, a basket mill or an immersion mill, and a dispersion blade disposed within the vessel; mixing the melted phase change ink carrier and optional dispersant with a dispersion blade in the vessel; adding a pigment to the melted phase change ink carrier and optional dispersant mixture in the vessel; wetting the pigment; after pigment wetting, reducing the pigment particle size in the vessel by inserting and operating the immersion mill head (basket assembly) containing the grinding media; and discharging the pigment dispersion product.

In embodiments, the present process focuses on preparing a pigment concentrate.

Pigmented solid inks usually utilize dry pigments as a starting point. Pigments are insoluble, fine particle size materials used in a number of applications including ink formulations, coatings, paints, and the like, to provide color, to hide substrates, to modify the properties of coatings, and to modify the performance properties of films. Pigments are often supplied by the manufacturer as dry aggregates and agglomerates many times larger than the primary particle size (usually of the order less than about 100 nanometers in diameter). These aggregates or agglomerates have to be reduced in size to less than about 100 nanometers in diameter with a narrow particle size distribution to form a stable dispersion in the solid ink medium. This is needed for the resulting solid ink formulation to demonstrate good jetting and print quality performance.

A common practice for reducing particle size of pigments is to form a pigment concentrate wherein the pigment is dispersed in a liquid medium, either aqueous on non-aqueous, at high pigment concentration (higher than the desired pigment concentration in final product) using one of a number of known milling or dispersion technologies. The choice of aqueous versus non-aqueous depends on the form of the final product. For example, pigment concentrates for a latex paint will be aqueous (latex paints are water based) and similarly concentrates for aqueous ink jet inks. For solvent based inks, the pigment concentrate will be non-aqueous containing, for example, an organic solvent. Solid inks such those as disclosed in the present application are also non-aqueous, and therefore, the pigment concentrate needs to be non-aqueous.

A number of considerations exist when forming a pigment concentrate for phase change or solid ink. The selection of the medium can comprise selecting a single material or a mixture of materials. Since the concentrate ends up in the final ink formulation, it is desirable to selected concentrate medium that from one or more of the components of the final ink, each of which plays a role in the performance of the ink.

The major component of the medium in the pigment concentrate is the ink vehicle. The ink vehicle carries the dispersed pigment into the final ink formulation, and is sometimes called a carrier. Any suitable ink vehicle can be employed, so long as the ink vehicle is non-aqueous. For example, the ink vehicle can be a wax or a non-polar solvent.

An optional dispersant can be used to wet the dry pigment with the ink vehicle and to stabilize the pigment particles in the ink vehicle by hindering the pigment particles from flocculating into larger agglomerates and thus delay settling. Generally, the dispersant achieves this function by adhering to the pigment particles and providing steric stabilization. The dispersant compound adheres to the pigment by, for example, being absorbed, attached or grafted to the pigment particle.

Dispersion of the dry ink into the ink medium (vehicle and dispersant) is, in selected embodiments, at high pigment loading, often in excess of 10% by weight, or as high as 50% by weight or higher. It is known that achievement of desired particle sizes in pigment dispersion equipment is more effective with higher solids loadings. Also, a lower volume of concentrate has to be processed per unit weight of pigment when higher solids loadings are utilized, hence the cost of processing the pigment concentrate is lowered.

At room temperature, the components of the medium in the pigmented ink concentrate are in solid form. For pigment dispersion to take place, it is necessary to first melt the said components (vehicle and dispersant), usually at temperatures above about 100° C. Thus, there is a limited choice, if any, of suitable dispersion technologies for this process. A need remains for a process for dispersion of pigments for pigmented solid ink wherein the pigment must be dispersed at a high temperature such as in a wax medium at a temperature of about 120° C. or higher, wherein the said temperature is above the melting point of said wax medium. High temperatures present serious challenges for most milling technologies. For example, if there are regions in the mill where the temperature can drop below the melting point of the wax, especially during startup, solidification of the wax can occur causing stoppage. Most milling technologies, therefore, are not suitable for waxes at such high temperatures. Indeed, many mill manufacturers have virtually no experience running their equipment at these temperatures.

The process herein is a high temperature pigment dispersion process for phase change ink wherein the pigment concentrate is prepared in a vessel comprising, in embodiments, a jacket surrounding a basket mill and at least one dispersion blade disposed within the basket mill. In embodiments, the basket mill comprises an immersion mill. All steps including melting, mixing, pigment wetting, and milling are carried out in the same vessel. There is no need of transferred vessels since the wetting step can be performed in the milling tank reducing processing time and clean up. Additional benefits include the lack of pumps, valves and mechanical seals. The present process, however, is not limited to use of one vessel.

The process herein enables use of high dispersion temperatures resulting in the production of pigmented ink concentrate in an economical manner. In embodiments, the present process provides pigment concentration that is increased by over two times that of previous processes from about 18 to about 40 percent by weight and dispersion time has been reduced by about one half from about 5 hours in previous processes to less than about 3 hours.

The process for the production of pigment dispersion concentrate herein can, in embodiments, employ a Hockmeyer HCPN-1/16 with a capacity of 2 kilograms of dispersion.

Step 1. The carrier and dispersant can be added to the tank and melted at the desired temperature. In embodiments, melting temperature can range from 110 up to 160° C., although not limited.

Step 2. After melting, the materials can be stirred for a period of time using a disperser blade after which the pigment addition is started.

Step 3. After all the pigment has been added, the pigment is allowed to wet for any suitable or desired time, with continued stirring, in embodiments, for about an hour.

Step 4. Then, in embodiments, the disperser blade is replaced by the immersion mill head (basket assembly) containing about 40 milliliters of 0.3 millimeter diameter zirconia. Following this, milling is carried out for any suitable or desired time, such as from about 1 to 3 hours.

Step 5. Product is discharged. The pigment dispersions from this process can contain up to about 40 to about 45 percent solids by weight with dispersant loadings as low as about 0.2 dispersant to pigment ratio. This represents an economical, low cost, high throughput process for the production of pigment dispersions.

In embodiments, melting the phase change ink carrier and optional dispersant comprises melting at a temperature of from about 100 to about 170° C., or from about 110 to about 170° C., or from about 110 to about 160° C., or from about 120 to about 160° C., or from about 120 to about 170° C. Melting the phase change ink carrier and optional dispersant in Step 1 can be done for any suitable or desired period of time. In embodiments, melting is carried out for a period of from about 0.1 hour to about 6 hours, or from about 0.1 hour to about 4 hours, or from about 0.5 hour to about 5 hours, or from about 0.5 to about 3 hours, or from about 1 to about 4 hours, or from about 1 to about 2 hours.

In step 2, the phase change ink carrier and optional dispersant are mixed. Mixing the melted phase change ink carrier and optional dispersant can be carried out by any suitable or desired method at any suitable or desired period temperature for any suitable or desired period of time. In embodiments, mixing comprises mixing the phase change ink carrier and optional dispersant with a dispersion blade set at from about 500 to about 5,000 revolutions per minute, from about 1,500 to about 4,000 revolutions per minute, or from about 2,000 to about 3,000 revolutions per minute.

Mixing can be carried out at any suitable or desired temperature selected in accordance with the specific carrier and optional dispersant. In embodiments, mixing is carried out at a temperature of from about 100 to about 170° C., or from about 110 to about 170° C., or from about 110 to about 160° C., or from about 120 to about 160° C.

Mixing can be carried out for any suitable or desired period of time. In embodiments, mixing is carried out for a period of from about 0.1 hour to about 4 hours, or from about 0.5 hour to about 3 hours, or from about 0.5 to about 2 hours.

In embodiments, mixing is accomplished by use of a dispersion blade set at 3,000 revolutions per minute at a temperature of about 110° C. to about 160° C. for a period of about 1 hour. In a specific embodiment, mixing is accomplished by use of a dispersion blade set at 2,800 revolutions per minute at a temperature of about 110° C. to about 160° C. for a period of about 1 hour.

In Step 4, a pigment is added to the melted, mixed phase change ink carrier and optional dispersant. The pigment can be added in any suitable or desired fashion. In embodiments, the pigment is added to the melted, mixed phase change ink carried over a period of from about 10 minutes to about 3 hours, or from about 15 minutes to about 2 hours, or from about 30 minutes to about 1 hour.

In Step 5, the pigment is wetted. Pigment wetting can be carried out by any suitable or desired method. In embodiments, pigment wetting herein comprises wetting the mixture by stirring the mixture by use of a dispersion blade set at a desired rotational speed for a desired period of time and at a desired temperature. In embodiments, a wetting is carried out by use of a dispersion blade set at from about 4,500 to about 5,000 revolutions per minute at a temperature of from about 110° C. to about 160° C. for a period of from about 0.25 about to about 4 hours, or from about 0.5 to about 3 hours, or from about 1 to about 2 hours.

In embodiments, wetting is accomplished at a temperature of about 110 to about 160° C. with a dispersion blade set at 4,500 rpm for a period of 1 to 3 hours, and, in embodiments, using baffles in the mixing vessel.

In embodiments, wetting the pigment comprises wetting with the dispersion blade set at from about 500 to about 5,000 revolutions per minute, or a tip speed of 4 feet per second to 40 feet per second, at a temperature of from about 110° C. to about 160° C. for a period of from about 0.25 about to about 4 hours.

Baffles can be employed to direct the flow of material being wetted. Any suitable or desired number of baffles can be employed. In embodiments, 1 to 100, 1 to 50, 1 to 25, 1 to 10, or 1 to 2 baffles are employed.

In Step 5, the pigment particle size is reduced by milling the wetted pigment in the vessel. Milling can be accomplished by any suitable or desired method. In embodiments, reducing the pigment particle size comprises reducing the pigment particle size with an immersion mill or reducing the pigment particle size will a basket mill. In embodiments, milling is carried out by use of an immersion mill head (basket assembly) inserted into the vessel containing the molten mixture) at a desired temperature for a desired period of time. In embodiments, milling is carried out with the mill head operating at from about 3,000 to about 8,000, from about 4,000 to about 7,000, or from about 5,000 to about 6,000 revolutions per minute at a temperature of from about 100 to about 170° C., or from about 110 to about 160° C., or from about 120 to about 160° C. for a period of from about 0.1 hour to about 6 hours, or from about 0.5 hour to about 4 hours, or from about 0.5 to about 2 hours, or from about 1 to about 1.5 hours. In embodiments, reducing the pigment particle size comprises milling the wetted pigment in the vessel with the immersion mill head running at from about 5,000 to about 6,000 revolutions per minute at a temperature of 110 to about 160° C. for a period of from about 1 to about 2 hours.

In a specific embodiment, reducing the pigment particle size comprises milling the wetted pigment in the jacketed vessel with the immersion mill and having an impeller turning at from about 3,000 to about 5,200 revolutions per minute or a tip speed of 23 feet per second to 40 feet per second at a temperature of from about 110° C. to about 160° C. for a period of from about 1 to about 1.5 hours.

Any suitable or desired media milling material, such as beads or shot, can be included in the immersion mill head (basket assembly). In embodiments, 40 milliliters of 0.3 millimeter diameter zirconia is disposed in the mill head for the milling step.

In a specific embodiment, milling is accomplished at a temperature of from about 110 to about 160° C. with the mill head operating at 5,200 rpm for a period of from about to about 1.5 hours.

In Step 6, the pigment dispersion product is discharged. The product is pigment concentrate. Discharging can be by any suitable or desired method. The pigment dispersion can be held in any suitable or desired container. In embodiments, the pigment dispersion is discharged at a temperature of from about 100 to about 170° C., or from about 110 to about 160° C., or from about 110 to about 170° C., or from about 120 to about 160° C. In embodiments, the pigment concentration is from about 5 to about 50 weight percent, based on the total weight of the pigment dispersion.

The preparation of pigment dispersions by the present method is more economical, less time consuming and less energy intensive than previous pigment dispersion processes. The process provides high yield, low cost, and low contamination dispersion product.

Ink Carrier.

Phase change inks as disclosed herein contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, triamides, tetra-amides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

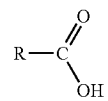

wherein R is an alkyl group, including linear, branched, saturated, unsaturated, and cyclic alkyl groups, said alkyl group in one embodiment having from about 36 to about 200 carbon atoms, although the number of carbon atoms can be outside of this ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2238 792, the disclosures of each of which are totally incorporated herein by reference. Also suitable are branched triamides as disclosed in U.S. Pat. No. 6,860,930, the disclosure of which is totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294939, British Patent GB 2305928, British Patent GB 2305670, British Patent GB 2290793, PCT Publication WO94/14902, PCT Publication WO97/12003, PCT Publication WO97/13816, PCT Publication WO96/14364, PCT Publication WO97/33943, and PCT Publication WO95/04760, the disclosures of each of which are totally incorporated herein by reference.

Mixtures of fatty amide materials and isocyanate-derived materials can also be employed as the ink carrier composition.

Additional suitable phase change ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

Specific examples of suitable waxes include polyethylene waxes such as PE 500 and PE 655, available from Baker Petrolite, Tulsa, Okla., Fischer-Tropsch waxes, available from Sasol Wax Americas, Inc., Shelton, Conn., waxes as disclosed in, for example, U.S. Pat. Nos. 7,407,539, 7,377,971, and 7,381,254, the disclosures of each of which are totally incorporated herein by reference, or the like, as well as mixtures thereof.

In one specific embodiment, the phase change ink carrier comprises (a) a polyethylene wax, present in the ink in an amount of from about 25 percent by weight of the ink to about 80 percent by weight of the ink, although the amount can be outside of this range; (b) a stearyl stearamide wax, present in the ink in an amount of from about 3 percent by weight of the ink to about 32 percent by weight of the ink, although the amount can be outside of this range; (c) a branched triamide of the formula

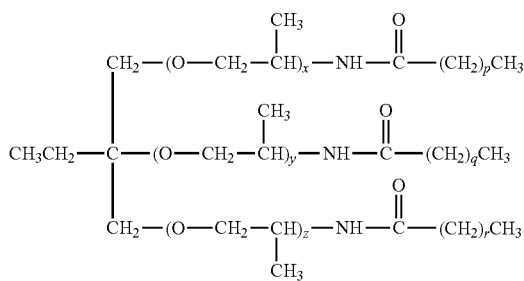

wherein x, y, and z each independently represent the number of propyleneoxy repeat units and x+y+z is from about 5 to about 6, and wherein p, q, and r each, independently of the others, are integers representing the number of repeat —(CH2)- units, wherein p, q, and r have an average value of from about 35, present in the ink in an amount of from about 5 percent by weight of the ink to about 32 percent by weight of the ink; (d) a triglyceride of hydrogenated abietic acid, present in the ink in an amount of from about 6 percent by weight of the ink to about 16 percent by weight of the ink; (e) a urethane resin that is the adduct of three equivalents of stearyl isocyanate and a glycerol-based propoxylate alcohol, present in the ink in an amount of from about 2 percent by weight of the ink to about 13 percent by weight of the ink; and (f) an antioxidant, present in the ink in an amount of from about 0.01 percent by weight of the ink to about 1 percent by weight of the ink, although all of the amounts can be outside of these ranges.

The ink carrier is present in the phase change ink in any desired or effective amount, such as from about 0.1 percent by weight of the ink to about 99 percent by weight of the ink.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGARD® 524, NAUGARD® 76, NAUGARD® 445, and NAUGARD® 512 (commercially available from Chemtura Corporation), IRGANOX® 1010 (commercially available from Ciba Geigy), and the like. When present, the optional antioxidant is present in the ink in any desired or effective amount, such as from about 0.01 percent by weight of the ink to about 20 percent by weight of the ink.

The inks disclosed herein are phase change inks. By this is meant that they are solids at a temperature of about 25° C. and are liquids when melted at temperatures of at least about 40° C. or higher.

The ink compositions in embodiments have peak melting points of no lower than about 50° C. to no higher than about 160° C. although the peak melting point can be outside of this range.

The ink compositions in embodiments have onset melting points of no lower than about 50° C. to no higher than about 75° C., although the onset melting point can be outside of this range.

The ink compositions generally have melt viscosities at the jetting temperature (in embodiments, jetting temperature being from about 75° C. to about 150° C.) of from about 2 centipoise to about 30 centipoise. In a specific embodiment, the inks have viscosities of from about 7 to about 15 centipoise at temperatures of about 110, 115, and/or 120° C.

Ink Dispersant.

Dispersant compounds can be used as dispersants in phase change inks. The phrase "used as a dispersant" means that the dispersant compound stabilizes the pigment particles in the ink vehicle by hindering the pigment particles from flocculating into larger agglomerates and thus delay settling. Generally, the dispersant compound achieves this function by adhering to the pigment particles and providing steric stabilization. The dispersant compound adheres to the pigment by, for example, being absorbed, attached or grafted to the pigment particle. In embodiments, the dispersant compound may be present in the ink in an amount of from about 0.1 to about 25 percent by weight of the ink. For example, in a particular embodiment, the dispersant compound may be present in the ink in an amount of from about 1 to about 10 percent by weight, or from about 1 to about 5 percent by weight.

Optionally, the amount of dispersant utilized is expressed as a ratio of dispersant to pigment in the ink. For example, in a particular embodiment, the dispersant compound may be present in the ink in an amount of from about 0.1:1 to about 2:1 dispersant to pigment ratio by weight, or from about 0.1:1 to about 2:1 dispersant to pigment ratio by weight.

The inks of the present disclosure can also optionally contain one or more dispersants and/or one or more surfactants for their known properties, such as controlling wetting properties of the ink composition, and stabilizing pigmented colorants. Any suitable or desired dispersant can be selected, such as Solsperse® 13240 and Solsperse® 11000 dispersants, available from Lubrizol Corporation, and dispersants described U.S. Pat. No. 7,973,186, which is hereby incorporated by reference herein in its entirety. The dispersant or surfactant may be present in the phase change ink in any suitable or desired amount, such as from about 0.1 to about 25 percent by weight of the ink, although the amount can be outside of this range.

Further examples of suitable additives that may be used in embodiments include, but are not limited to, MODAFLOW®

2100, available from Cytec Surface Specialties, OLOA 1200, OLOA 11000, OLOA 11001, available from Chevron Oronite Company LLC, SOLSPERSE® 9000, 16000, 17000, 17940, 18000, 19000, 19240, 20000, 34750, 36000, 39000, 41000, 54000, available from Lubrizol Corporation) and mixtures thereof. Exemplary ink compositions may include one or more dispersants and/or one or more surfactants for their known properties, such as controlling wetting properties of the ink composition, and stabilizing colorants.

In embodiments, the dispersant may comprise from about 0.1 to about 25% by weight of the ink composition, such as from about 0.5 to about 10%, from about 1 to about 6%, or from about 2 to about 5%.

The dispersant concentrations above and colorant concentrations below deal with the final ink composition only.

For the pigment concentrate, any suitable or desired concentration of colorant or dispersant can be present in the pigment concentrate. In embodiments, a colorant concentration in the pigment concentrate may be from 10 to about 70 percent by weight, or from about 20 to about 60 percent by weight. Dispersant loadings are typically a function of colorant, that is dispersant-to-colorant ratio by weight. In embodiments, the dispersant may be present in the pigment concentrate in a dispersant-to-colorant weight ratio of 0.05 to 2, or 0.1 to 1.5 or 0.2 to 1.0.

Ink Colorant.

The phase change ink herein can contain any suitable or desired colorant such as dyes, pigments, mixtures thereof, and the like. The colorant can be present in the ink in any desired or effective amount to obtain the desired color or hue, in embodiments, in an amount of from about 0.1 percent by weight of the ink to about 50 percent by weight of the ink, from about 0.1 percent by weight of the ink to about 20 percent by weight of the ink, although the amount can be outside of these ranges.

In specific embodiments, the colorant is a pigment. In a specific embodiment, the colorant is a pigment selected from the group consisting of a magenta pigment, a cyan pigment, a yellow pigment, a black pigment, and mixtures and combinations thereof. Pigment dispersions in the ink base may be stabilized by synergists and dispersants.

Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL® Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

The wetting step in the dispersion process herein is carried out in the same vessel or tank as the milling. In embodiments, the pigment concentrate is in a wax vehicle optionally comprising a dispersant which contains up to about 45 percent by weight pigment and, in embodiments has a dispersant-to-pigment ratio of from about 0.2 to about 0.8. In embodiments, the process herein can be carried out at a temperature of from about 110 to about 160° C. As noted hereinabove, the preparation of pigment dispersions by the present method is more economical, less time consuming and less energy intensive than previous pigment dispersion processes. The process provides high yield, low cost, and low contamination dispersion product.

The phase ink compositions of the present disclosure can be prepared by any desired or suitable method. In embodiments, a method for preparing a phase change ink composition herein comprises combining a pigment dispersion as described herein, a phase change ink vehicle, an optional synergist; and an optional dispersant; to produce a phase change ink composition.

For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In embodiments, a method herein comprises incorporating into an ink jet printing apparatus a phase change ink composition as described herein; melting the ink composition; and causing droplets of the melted ink to be ejected in an imagewise pattern onto a substrate.

Ink jetting temperature can be any suitable or desired jetting temperature, in embodiments, jetting temperature being from about 50° C. to about 140° C. or more typically from about 100° C. to about 140° C. The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, in another embodiment, of greater than about $10^5$ centipoise at a temperature of less than about 40° C., in another embodiment, of less than about 15 centipoise at a temperature of no less than about 70° C., although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Control Example 1 demonstrates the extremely high process time required to process pigmented ink concentrates in an attritor. Control Example 2 is an illustration of the Hockmeyer dispersion process wherein a low pigment concentration of 18 percent by weight and low dispersion temperature necessitates a longer dispersion time.

The components used in the pigmented phase change ink concentrates and phase change inks of the following Examples are described in Tables 1 and 2.

TABLE 1

| Component | Composition Weight Percent |
| --- | --- |
| Kemamide ® S-180 | Stearyl stearamide available from Chemtura Corporation |
| Solsperse ® 17000 | Polymeric dispersant available from Lubrizol Corporation |
| Polyethyleneimine dispersant | As prepared in Example 1 of U.S. Pat. No. 7,973,186 (see below) |
| Pigment Red 57:1 | Magenta pigment available from Clariant Corporation |
| Mogul ® L | Carbon black available from Cabot Corporation |
| Solsperse ® 5000 | A derivatized sulfonated copper phthalocyanine synergist |

TABLE 2

| Component | Composition Weight Percent |
| --- | --- |
| Polyethylene wax | A fractionated polyethylene wax available from The International Group Inc. |
| Triamide wax | As prepared in Example 2 of U.S. Pat. No. 6,860,930 (see below) |
| Kemamide ® S-180 | Stearyl stearamide available from Chemtura Corporation |
| KE-100 ® | An ester of tetrahydroabietic acid and glycerol available from Arakawa Industries |
| Urethane resin | As prepared in Example 4 of U.S. Pat. No. 6,309,453 (see below) |
| Naugard ® 445 | Antioxidant available from Uniroyal Chemical Company |

A triamide wax prepared as described in Example II of U.S. Pat. No. 6,860,930, is prepared as follows. To a 1,000 milliliter four-neck round bottom flask fitted with a Trubore stirrer, N$_2$ inlet, Dean-Stark trap with condenser and N2 outlet and thermocouple-temperature controller was added 350.62 grams (0.3675 moles) of UNICID® 550 (a mono-acid obtained from Baker-Petrolite Corp., Cincinnati, Ohio, of the formula CH$_3$(CH$_2$)$_n$COOH, wherein n has an average value of about 37 and is believed to have a range of from about 34 to about 40) and 0.79 grams of NAUGARD® 524 (Chemtura Corporation). The mixture was heated to 115° C. to melt and stirred at atmospheric pressure under N2. 51.33 grams (0.1167 moles) of JEFFAMINE® T-403 (mixture of triamines obtained from Huntsman Corporation, Houston, Tex., of the formula

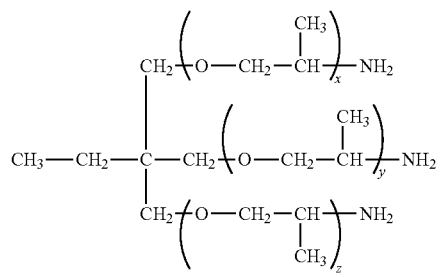

wherein x, y, and z are each integers representing the number of repeat propyleneoxy units, wherein x, y, and z may each be zero, and wherein the sum of x+y+z is from about 5 to about 6) was then added to the reaction mixture, and the reaction temperature was increased to 200° C. gradually over 0.5 hour and held at that temperature for another 3 hours. Some water was carried out by slow blowing N₂ and condensed into the trap when the mixture temperature reached about 180° C. The trap and condenser were then removed, and vacuum (about 25 mm Hg) was applied for about 0.5 hour and then released. The liquid product was cooled down to about 150° C. and poured onto aluminum to solidify. The resulting product was believed to be of the formula

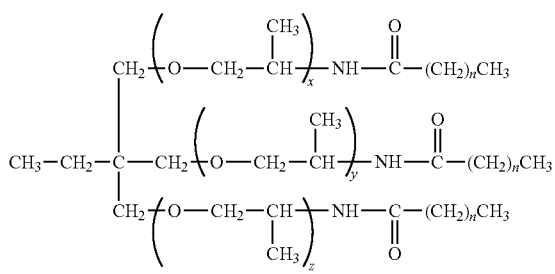

wherein n, x, y, and z are as defined hereinabove in this Example.

A dispersant prepared as described in Example 1 of U.S. Pat. No. 7,973,186, is prepared as follows. Into a 1 liter resin kettle fitted with heating mantle, mechanical stirring, Dean-Stark trap, reflux condenser and temperature sensor were introduced 192.78 grams (g) of Unicid® 700 (a long chain, linear carboxylic acid having an average carbon chain length of 48, available from Baker Petrolite) and 60.3 g of E-100® (a mixture of tetraethylenepentamine, (TEPA), pentaethylenehexamine (PEHA), hexaethyleneheptamine (HEHA), and higher molecular weight materials with a number-average molecular weight of 250 to 300 grams per mole, available from Huntsman. Under a stream of Argon, the temperature in the kettle was raised to 100° C. and the resin was allowed to melt. When the resin was completely melted, the temperature was gradually raised to 180° C. with stirring, and the reaction was allowed to proceed for 3 hours. 3.6 milliliters of water was collected into the Dean-Stark trap. The reaction was stopped, cooled down to 140° C. and discharged to an aluminum tray to give 249 g of the amide as a beige solid.

A urethane resin prepared as described in Example 4 of U.S. Pat. No. 6,309,453, is prepared as follows. About 80.0 grams (0.052 moles) of ARCOL LHT 112 (glycerol propoxylate available from ARCO Chemical Co.) and about 46.6 grams (0.156 moles) octadecyl isocyanate (Mondur O-Octadecyl Isocyanate available from Bayer Corporation) were placed in a 200 milliliter beaker with a magnet and heated to 115° C. with a silicone oil bath. Five drops of catalyst (Fascat® 4202, dibutyltindilaurate available from Elf Atochem North American, Inc.) were added and the mixture allowed to react for 2 hours at 115° C. An FT-IR of the reaction product showed the absence (disappearance) of a peak at ~2285 cm⁻¹ (NCO) and the appearance (or increase in magnitude) of peaks at ~1740-1680 cm⁻¹ and ~1540-1530 cm⁻¹ corresponding to urethane frequencies. The final urethane product was then poured into a specimen jar and allowed to cool and harden. This final product was a solid at room temperature characterized by a viscosity of about 15.8 cPs as measured by a Ferranti-Shirley cone-plate viscometer at about 135° C. and a melting point of about 23.8° C. as measured by a Differential Scanning calorimetry using a DuPont 2100 calorimeter at a scan rate of 20° C./minute.

A polyethyleneimine dispersant prepared as described in Example 1 of U.S. Pat. No. 7,973,186, is prepared as follows. Into a 1 liter resin kettle fitted with heating mantle, mechanical stirring, Dean-Stark trap, reflux condenser and temperature sensor were introduced 192.78 grams (g) of Unicid® 700 (a long chain, linear carboxylic acid having an average carbon chain length of 48, available from Baker Petrolite) and 60.3 g of E-100® (a mixture of tetraethylenepentamine, (TEPA), pentaethylenehexamine (PEHA), hexaethyleneheptamine (HEHA), and higher molecular weight materials with a number-average molecular weight of 250 to 300 grams per mole, available from Huntsman. Under a stream of Argon, the temperature in the kettle was raised to 100° C. and the resin was allowed to melt. When the resin was completely melted, the temperature was gradually raised to 180° C. with stirring, and the reaction was allowed to proceed for 3 hours. 3.6 milliliters of water was collected into the Dean-Stark trap. The reaction was stopped, cooled down to 140° C. and discharged to an aluminum tray to give 249 g of the amide as a beige solid.

Control Example 1

Carbon Black Pigment Dispersion in 1S Attritor. (20 Percent Pigment Concentration, 0.86:1 Dispersant-to-Pigment Ratio)

A Union Process 1S attritor with a tank capacity of 3 liters was charged with 28 kilograms of ⅛ inch 440C stainless steel media. The pigment wetting step was carried out in a 4 liter stainless steel beaker by first adding about 1,051 grams of Kemamide® S-180 wax, about 79 grams of Solsperse® 5000 synergist and about 310 grams of Solsperse® 17000 polymeric dispersant. After melting, about 360 grams of Mogul® L carbon black was added and stirred for an additional 60 minutes. The pigment slurry was then transferred to the attritor and attrition started. Attrition temperature was kept constant at around 120° C. After milling at about 240 revolutions per minute for 284 hours (12 days), the final concentrate comprising of about 20 percent by weight carbon black with a dispersant-to-pigment ratio of about 0.86:1 was discharged and cooled. The Z-average particle size of the carbon black in the concentrate was about 80 nanometers with Polydispersity Index of about 0.141 as measured on a Malvern Zetasizer particle size analyzer.

Control Example 2

Magenta Pigment Concentrate in Hockmeyer Immersion Mill (18 Percent Pigment Concentration, 0.8:1 Dispersant-to-Pigment Ratio)

This experiment was performed in the Hockmeyer HCPN 1/16 Micro Immersion Mill. The Hockmeyer mill tank was charged with about 1,420 grams of Kemamide® S-180 wax and about 300 grams of polyethyleneimine dispersant. After the wax and dispersant were melted, stirring was carried out for about 60 minutes followed by the addition of about 380 grams of Pigment Red 57:1 magenta pigment over the period of about 30 minutes. The pigment was allowed to wet for about one hour at 4,500 revolutions per minute. The 0.1 millimeter opening milling basket attachment previously loaded with 0.3 millimeter zirconia milling media was immersed in the tank and milling started. After milling at about 5,200 revolutions per minute at about 123° C. for about 6 hours, the final concentrate comprising of about 18 percent by weight Pigment Red 57:1 magenta pigment with a dispersant-to-pigment ratio of about 0.8:1 was discharged and cooled. The Z-average particle size of the pigment in the concentrate was about 122.3 nanometers with a Polydispersity Index of 0.104.

Example 3

Magenta Pigment Concentrate in Hockmeyer Immersion Mill (40 Percent Pigment Concentration, 0.6:1 Dispersant-to-Pigment Ratio)

The Hockmeyer mill tank was charged with about 324 grams of Kemamide® S-180 wax and about 216 grams of polyethyleneimine dispersant. After the wax and dispersant were melted, stirring was carried for about 90 minutes at a temperature of about 140° C. followed by the addition of about 360 grams of Pigment Red 57:1 magenta pigment over the period of about 90 minutes. The pigment was allowed to wet for about 120 minutes at 5,600 revolutions per minute. The immersion mill head previously loaded with 0.3 millimeter zirconia milling media was immersed in the tank and milling started. After milling at about 5,200 revolutions per minute at about 150° C. for about 120 minutes, the final concentrate comprising of about 18 percent by weight Pigment Red 57:1 magenta pigment with a dispersant-to-pigment ratio of about 0.6:1. The Z-average particle size of the pigment in the concentrate was about 120.2 nanometers with a Polydispersity Index of 0.151.

A phase change ink was prepared by mixing this concentrate with the ingredients listed in Table 2 at 120° C. in a stainless steel vessel for about 90 minutes. The resulting ink which was filtered through a 5 micron 304 stainless steel filter (325 mesh×2300 mesh) at about 120° C. demonstrated good print quality performance in a Xerox phase change printer.

Example 4

Magenta Pigment Concentrate in Hockmeyer Immersion Mill (30 Percent Pigment Concentration, 0.6:1 Dispersant-to-Pigment Ratio)

The Hockmeyer mill tank was charged with about 1,040 grams of Kemamide® S-180 wax and about 360 grams of polyethyleneimine dispersant. After the wax and dispersant were melted, stirring was carried for about 90 minutes at a temperature of about 150° C. followed by the addition of about 600 grams of Pigment Red 57:1 magenta pigment over the period of about 50 minutes. The pigment was allowed to wet for about 70 minutes at 4,700 revolutions per minute. The immersion mill head previously loaded with 0.3 millimeter zirconia milling media was immersed in the tank and milling started. After milling at about 5,200 revolutions per minute at about 157° C. for about 180 minutes, the final concentrate comprising of about 30 percent by weight Pigment Red 57:1 magenta pigment with a dispersant-to-pigment ratio of about 0.6:1. Z-average particle size of the final product was 137 nanometers with a
Polydispersity Index of 0.165.

A phase change ink was prepared by mixing this concentrate with the components listed in Table 2 at 120° C. for about 90 minutes. The resulting ink which was filtered through a 5 micron 304 stainless steel filter (325 mesh×2300 mesh) at about 120° C. demonstrated good print quality performance in a Xerox phase change printer.

Example 5

Magenta Pigment Concentrate in Hockmeyer Immersion Mill (18 Percent Pigment Concentration, 0.6:1 Dispersant-to-Pigment Ratio)

The Hockmeyer mill tank was charged with about 1,424 grams of Kemamide® S-180 wax and about 216 grams of polyethyleneimine dispersant. After the wax and dispersant were melted, stirring was carried for about 90 minutes at a temperature of about 120° C. followed by the addition of about 360 grams of Pigment Red 57:1 magenta pigment over the period of about 20 minutes. The pigment was allowed to wet for about 60 minutes at 5,200 revolutions per minute. The immersion mill head previously loaded with 0.3 millimeter zirconia milling media was immersed in the tank and milling started. After milling at about 5,200 revolutions per minute at about 115° C. for about 180 minutes, the final concentrate comprising of about 18 percent by weight Pigment Red 57:1 magenta pigment with a dispersant-to-pigment ratio of about 0.6:1. Z-average particle size of the final product was 162 nanometers with a Polydispersity Index of 0.276.

A phase change ink was prepared by mixing this concentrate with the components listed in Table 2 at 120° C. for about 90 minutes. The resulting ink which was filtered through a 5 micron 304 stainless steel filter (325 mesh×2300 mesh) at about 120° C. demonstrated good print quality performance in a Xerox phase change printer.

The present process provides a significant increase in pigment concentration in the pigment dispersion, in embodiments, up to about 40 percent, which makes the process herein more economically viable than previous processes. In addition, dispersant material has been decreased to a dispersant-to-pigment ratio of about 0.2 which impacts the amount of raw materials needed to produce a stable dispersion. This process further provides considerably reduced processing time which also minimizes contamination from milling media. Overall, this process herein provides reduced unit manufacturing cost of pigmented phase change ink products thus rendering the products more suitable for commercialization.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process for preparing a pigment dispersion comprising:
melting a phase change ink carrier and an optional dispersant at a temperature of from about 100° C. to about 170° C. in a jacketed vessel comprising a jacket surrounding an immersion mill, a jacket surrounding a basket mill, or a jacket surrounding a dispersion blade attachment, disposed within the jacketed vessel;
mixing the melted phase change ink carrier and optional dispersant with a dispersion blade in the jacketed vessel;

adding a pigment to the melted, mixed phase change ink carrier and optional dispersant in the jacketed vessel;
wetting the pigment;
after pigment wetting, reducing the pigment particle size in the vessel; and
discharging the pigment dispersion.

2. The process of claim 1, wherein the jacketed vessel comprises a jacket surrounding a basket mill.

3. The process of claim 1, wherein the jacketed vessel comprises a jacket surrounding an immersion mill.

4. The process of claim 1, wherein melting the phase change ink carrier comprises melting at a temperature of from about 110° C. to about 170° C.

5. The process of claim 1, wherein melting comprises melting the phase change ink carrier and optional dispersant for a period of from about 0.1 to about 4 hours.

6. The process of claim 1, wherein melting comprises melting the phase change ink carrier and optional dispersant for a period of from about 0.5 to about 3 hours.

7. The process of claim 1, wherein melting comprises melting the phase change ink carrier and optional dispersant for a period of from about 1 to about 2 hours.

8. The process of claim 1, wherein mixing comprises mixing the phase change ink carrier and optional dispersant with a dispersion blade set at from about 500 to about 5,000 revolutions per minute, or a tip speed of 4 feet per second to 40 feet per second.

9. The process of claim 1, wherein mixing the phase change ink carrier and optional dispersant comprises mixing at a temperature of from about 110 to about 170° C.

10. The process of claim 1, wherein mixing the phase change ink carrier and optional dispersant comprises mixing at a temperature of from about 110 to about 160° C.

11. The process of claim 1, wherein mixing the phase change ink carrier and optional dispersant comprises mixing at a temperature of from about 120 to about 160° C.

12. The process of claim 1, wherein mixing the phase change ink carrier and optional dispersant comprises for a period of from about 0.1 to about 4 hours.

13. The process of claim 1, wherein mixing the phase change ink carrier and optional dispersant comprises mixing for a period of from about 0.5 to about 2 hours.

14. The process of claim 1, wherein mixing comprises mixing the phase change ink carrier and an optional dispersant with the dispersion blade set at 3,000 rpm at a temperature of about 110 to about 160° C. for a period of about 1 hour.

15. The process of claim 1, wherein adding a pigment to the melted, mixed phase change ink carrier comprises adding the pigment over a period of from about 30 minutes to about 1 hour.

16. The process of claim 1, wherein reducing the pigment particle size comprises reducing the pigment particle size with an immersion mill, or reducing the pigment particle size with a basket mill.

17. The process of claim 1, wherein wetting the pigment comprises wetting with the dispersion blade set at from about 500 to about 5,000 revolutions per minute, or a tip speed of 4 feet per second to 40 feet per second, at a temperature of from about 110° C. to about 160° C. for a period of from about 0.25 about to about 4 hours.

18. The process of claim 1, wherein reducing the pigment particle size comprises milling the wetted pigment in the jacketed vessel with the immersion mill and having an impeller turning at from about 3,000 to about 5,200 revolutions per minute or a tip speed of 23 feet per second to 40 feet per second at a temperature of from about 110° C. to about 160° C. for a period of from about 1 to about 1.5 hours.

19. The process of claim 1, wherein discharging the pigment dispersion comprising discharging at a temperature of from about 110° C. to about 160° C.

20. The process of claim 1, wherein the phase change ink carrier comprises a wax.

21. The process of claim 1, wherein the pigment is selected from the group consisting of a magenta pigment, a cyan pigment, a yellow pigment, a black pigment, and mixtures and combinations thereof.

* * * * *